Patented Sept. 1, 1925.

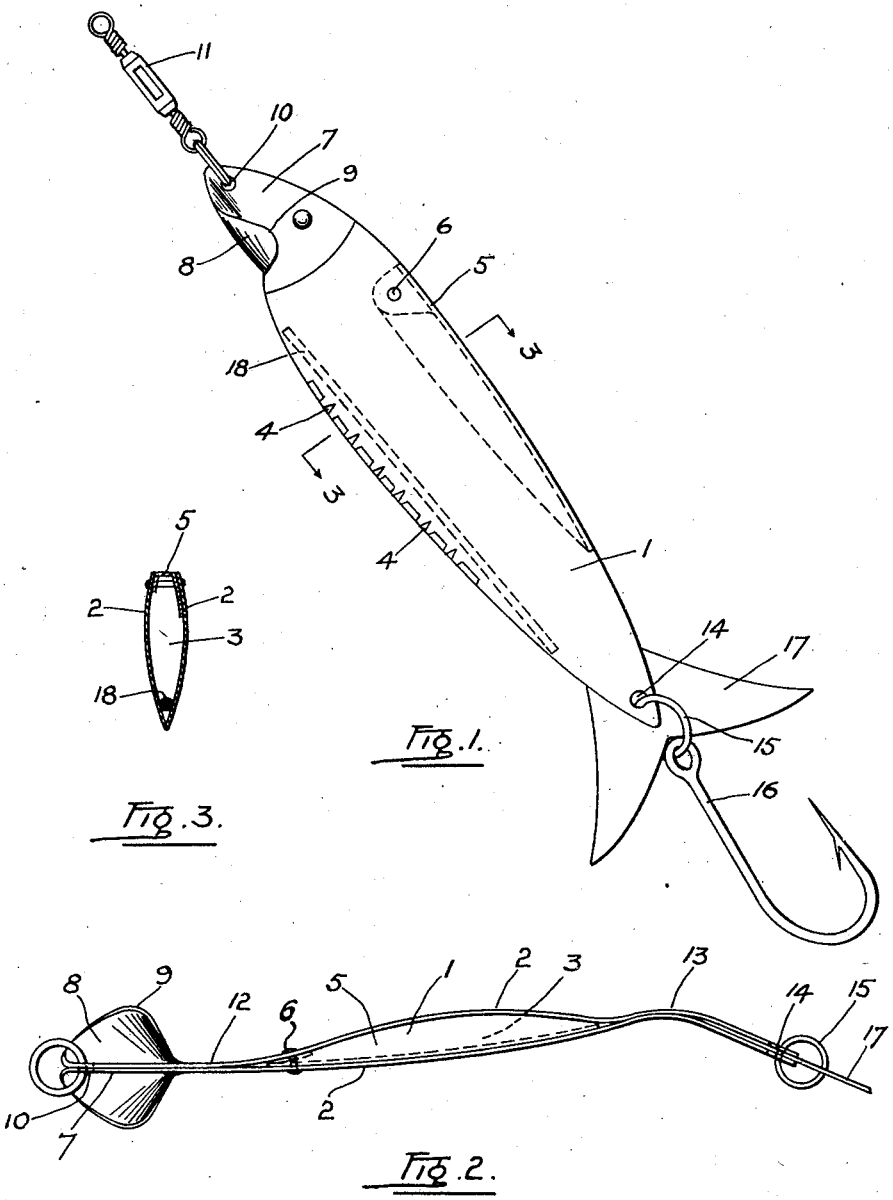

1,551,677

UNITED STATES PATENT OFFICE.

LEO ALOIS MALFET, OF VANCOUVER, BRITISH COLUMBIA, CANADA.

TROLLING DEVICE.

Application filed June 3, 1924. Serial No. 717,620.

*To all whom it may concern:*

Be it known that I, LEO ALOIS MALFET, a subject of the King of Great Britain, and a resident of the city of Vancouver, in the Province of British Columbia, Canada, have invented certain new and useful Improvements in Trolling Devices, of which the following is a specification.

My invention relates to improvements in trolling devices the objects of which are to provide first a means whereby the device may be weighted conveniently, second, means for maintaining the device in upright position in the water, third, to provide a tail which is flexible and capable of being collapsed when passing between the jaws of a fish so that the hook is brought into engaging position, and fourth, to provide for the device to troll from side to side simulating the natural swimming action of a fish.

The device consists essentially of a hollow bodied device in the form of a fish, which is provided with a pair of flukes at the head end and a flexible member at the tail end, as will be more fully described in the following specification in which:—

Fig. 1 is a general view of my invention.

Fig. 2 is a view looking down.

Fig. 3 is a sectional view taken on the line 3—3 of Fig. 1.

In the drawings like characters of reference indicate corresponding parts in each figure.

The numeral 1 indicates generally the body portion of the device which is formed with a pair of concavo-convex plates 2 placed with their concave sides opposing each other to provide a body space 3, the lower edges of the plates 2 are suitably bound together and are provided with a plurality of apertures 4, the purpose of which will hereinafter appear, the upper edges of the plates are spaced apart for a portion of their length to provide access to the body space 3, and are provided with a closure 5 (see Fig. 3) which is hingedly connected to the body 1 by a pin 6. The head portion 7 of the device, which is preferably formed by the outer ends of the side plates 2, is provided with a pair of outwardly curved flukes 8 which are upturned at their outer extremities as at 9 for the purpose of drawing the head downwards against the upward pull of the fishing line. The forward end of the head 7 is apertured as at 10 for the attachment of the usual swivel 11.

The body portion 1 is oppositely curved at its front and rear ends as at 12 and 13 the purpose of which will appear later. Adjacent the rear curve 13 an aperture 14 is formed into which a ring 15 is secured for the purpose of giving free movement to the hook 16.

The numeral 17 indicates a tail of rubber or other flexible and insoluble material, and which has sufficient inherent lateral resistance that the first movement of the device through the water will be in the direction induced by the curve 13 of the body, and that after a sufficient degree of angularity to the general course of the trolling has been developed, such resistance will be overcome, the tail assuming a curve which will permit the device to follow generally the direction induced by the curve 12 in the body 1 which alternation of direction imparts a lifelike action to the device.

The numeral 18 indicates a weight which is preferably in the form of a bar, and which is dropped into the body space 3 for the purpose of regulating the depth at which the device will travel in the water when trolling.

Having thus described the several parts of my invention I will now briefly explain its use.

The device is baited by placing a piece of any desired bait in the body 1 and closing down the hinged closure 5. If deep fishing is contemplated the body is also suitably loaded with weights 18. On being drawn through the water the flukes 8 of the head 7 impart a downward pull to the forward end of the body equal to the upward pull of the trolling line so that the device is maintained upon a more or less horizontal course.

The fish is attracted to the device first by the smell of the bait placed in the body space, and secondly by the fishlike appearance of the device. The fish on attacking the device from the rear, may bite the device but the collapsing of the tail will permit the body to be freely drawn from the fish's mouth and the hook to be firmly lodged therein.

What I claim as my invention is:

1. A trolling device comprising a fish like body having a head and a flexible tail, said body being oppositely and laterally curved adjacent the head and tail and means extending from the head for maintaining the device on a horizontal course when being drawn through the water.

2. A trolling device comprising a body having a comparatively rigid head and a flexible tail, said head and tail being disposed to extend laterally from the body and in opposite directions, and a pair of laterally extending flukes fixed to the body and shaped to draw the head downwardly and to cause the body to maintain a horizontal course through the water.

Dated at Vancouver, B. C., this 8th day of May, 1924.

LEO ALOIS MALFET.